(12) United States Patent
Mononen et al.

(10) Patent No.: US 7,831,235 B2
(45) Date of Patent: Nov. 9, 2010

(54) SYSTEM AND METHOD FOR REQUESTING REMOTE CARE USING MOBILE DEVICES

(75) Inventors: Jari A. Mononen, Ruutana (FI); Seppo Pohja, Tampere (FI); Ulla Konkarikoski, Tampere (FI); Heikki Korkeamaki, Oulu (FI)

(73) Assignee: Nokia Corporation, Espoo (FI)

( * ) Notice: Subject to any disclaimer, the term of this patent is extended or adjusted under 35 U.S.C. 154(b) by 918 days.

(21) Appl. No.: 11/378,599

(22) Filed: Mar. 17, 2006

(65) Prior Publication Data

US 2007/0218867 A1 Sep. 20, 2007

(51) Int. Cl.
*H04M 11/04* (2006.01)
(52) U.S. Cl. .................. 455/404.1; 455/403; 455/404.2; 455/456.1; 455/456.3
(58) Field of Classification Search .............. 455/404.1, 455/403, 404.2, 456.1, 456.3
See application file for complete search history.

(56) References Cited

U.S. PATENT DOCUMENTS

| | | | |
|---|---|---|---|
| 4,273,960 A | | 6/1981 | Fahey et al. |
| 4,686,697 A | | 8/1987 | Shapiro et al. |
| 6,356,203 B1 * | | 3/2002 | Halleck et al. .............. 340/689 |
| 2003/0027547 A1 * | | 2/2003 | Wade ......................... 455/404 |
| 2006/0069609 A1 * | | 3/2006 | Chiou ........................... 705/13 |
| 2006/0135181 A1 * | | 6/2006 | Dale et al. ................. 455/456.5 |
| 2006/0233107 A1 * | | 10/2006 | Croak et al. .................. 370/235 |
| 2007/0035415 A1 * | | 2/2007 | Dawson .................. 340/870.07 |
| 2007/0133818 A1 * | | 6/2007 | Griffin ........................ 381/94.1 |

FOREIGN PATENT DOCUMENTS

| | | |
|---|---|---|
| DE | 19927218 | 12/2000 |
| DE | 10004041 | 9/2001 |
| FR | 2779589 | 6/1998 |
| GB | 2399928 | 9/2004 |
| JP | 200209997 | 4/2006 |

OTHER PUBLICATIONS

International Search report for PCT Application No. PCT/US2007/000649.

* cited by examiner

*Primary Examiner*—Joseph H. Feild
*Assistant Examiner*—Huy D Nguyen
(74) *Attorney, Agent, or Firm*—AlbertDhand LLP

(57) ABSTRACT

A system and method for implementing situation-related actions in a mobile electronic device such as a mobile telephone. The mobile electronic device is programmed with a definition of at least one triggering event, as well as a definition of at least one response activity that is to occur if the at least one triggering event is detected. The present invention involves the monitoring of the mobile electronic device for the occurrence of the at least one triggering event. Upon detecting that the at least one triggering event has occurred, the at least one response activity is initiated.

13 Claims, 5 Drawing Sheets

US 7,831,235 B2

SYSTEM AND METHOD FOR REQUESTING REMOTE CARE USING MOBILE DEVICES

FIELD OF THE INVENTION

The present invention relates generally to mobile electronic devices such as mobile telephones. More particularly, the present invention relates to the use of emergency situation detection systems in conjunction with mobile electronic devices.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Many mobile devices are currently used as tools to increase security and care in everyday life. In practice, it is possible to make a phone call and check with friends and family that an individual is alright. However, mobile devices can also be used to make distress calls and to ask for emergency assistance. On the other hand, for example in specific houses designed for elder individuals, there are a number of systems where remote care can be implemented using specific sensors to provide better security for the residents. For example, when a bathroom door has not been opened at least twice in a day, or when a front door is opened during the night, a warning call can be initiated to family members or to specific call centers. As people live to older ages, this type of care and assistance will be needed more often and in a variety of different situations.

Current implementations of remote care systems are very specific in nature. Such systems are typically implemented with regard to a specific space or residence, and these systems and usually quite expensive. Additionally, with such systems, specific service agreements need to be made, and these types of arrangements are usually used only as a last resort. However, there is a still a need for alternatives that provide potential assistance on a "lighter" basis and for the non-elderly. Such systems may also be desirable even in situations where a person feels that additional security and care is needed, not as a constant follow-up, but on only an occasional basis.

As discussed above, there are currently a number of different remote care and security appliances available that can be used to care for following up on hospital patients or other individuals, such as the elderly, who need looking after. Usually, these alternatives are connected to specific services and need additional installation to homes or care facilities.

In addition to the above, there are currently a number of mobile products that have a number of sensors that are used to detect if the mobile device is standing in a vertical position and has not fallen to a horizontal position. If the mobile device "falls" to a horizontal position, a GPS systems attached to the mobile device will send a SMS message to a specific number to inform others that something has happened. Such systems are often intended for use by horseback riders, so that assistance can be quickly provided in the event that the rider falls down and seriously hurts himself or herself. Although such a system is useful in specific situations, these systems rely primarily on attached sensors, making them of somewhat limited use and possessing an added cost based upon the cost of the sensor.

SUMMARY OF THE INVENTION

The present invention combines context information analysis and mobile device usage to provide for a system that detects distress situations and makes remote care and assistance an integral part of mobile devices. Most people make voice calls at least a couple of times a day, occasionally put the keypad lock on and off, carry the mobile device along, and move around a geographic region. Based on this type of information, personally-created triggers can be programmed into the mobile device. For example, a device can be automatically or manually programmed to detect situations such as the person having not made or answered any calls in a day or two, the mobile device being in same cellular cell for an entire day without moving at all, the device having not been touched for a long time, or there being complete silence around the device. When one or more of these triggers are detected, the device initiates specific actions that are selected by the end-user. For example, the detection of such a trigger can result in a SMS message being transmitted to a family member or friend.

The present invention can be easily implemented into existing mobile devices, as no additional hardware is needed. This lack of additional hardware also makes the present invention very cost effective to implement. Unlike conventional emergency care systems, the present invention is customizable by a user, both in the creation of trigger events and in the actions that are taken in response thereto. Additionally, although younger and healthy users may not always want or desire emergency care and monitoring, the system of the present is only minimally intrusive, making the system of the present invention more likely to be used. The present invention can also strengthen social networks when people can exchange care activities between each other. The functionality of the present invention provides for a virtually limitless variety of care notification options, even providing care notification for babies, infants or pets in certain situations, particularly if surrounding audio information is processed and used as a trigger. The present invention can also serve as a good content and traffic generator, as devices may send checking messages on occasion, and people would respond to these requests.

These and other advantages and features of the invention, together with the organization and manner of operation thereof, will become apparent from the following detailed description when taken in conjunction with the accompanying drawings, wherein like elements have like numerals throughout the several drawings described below.

DETAILED DESCRIPTION OF THE PREFERRED EMBODIMENTS

Figure 1:
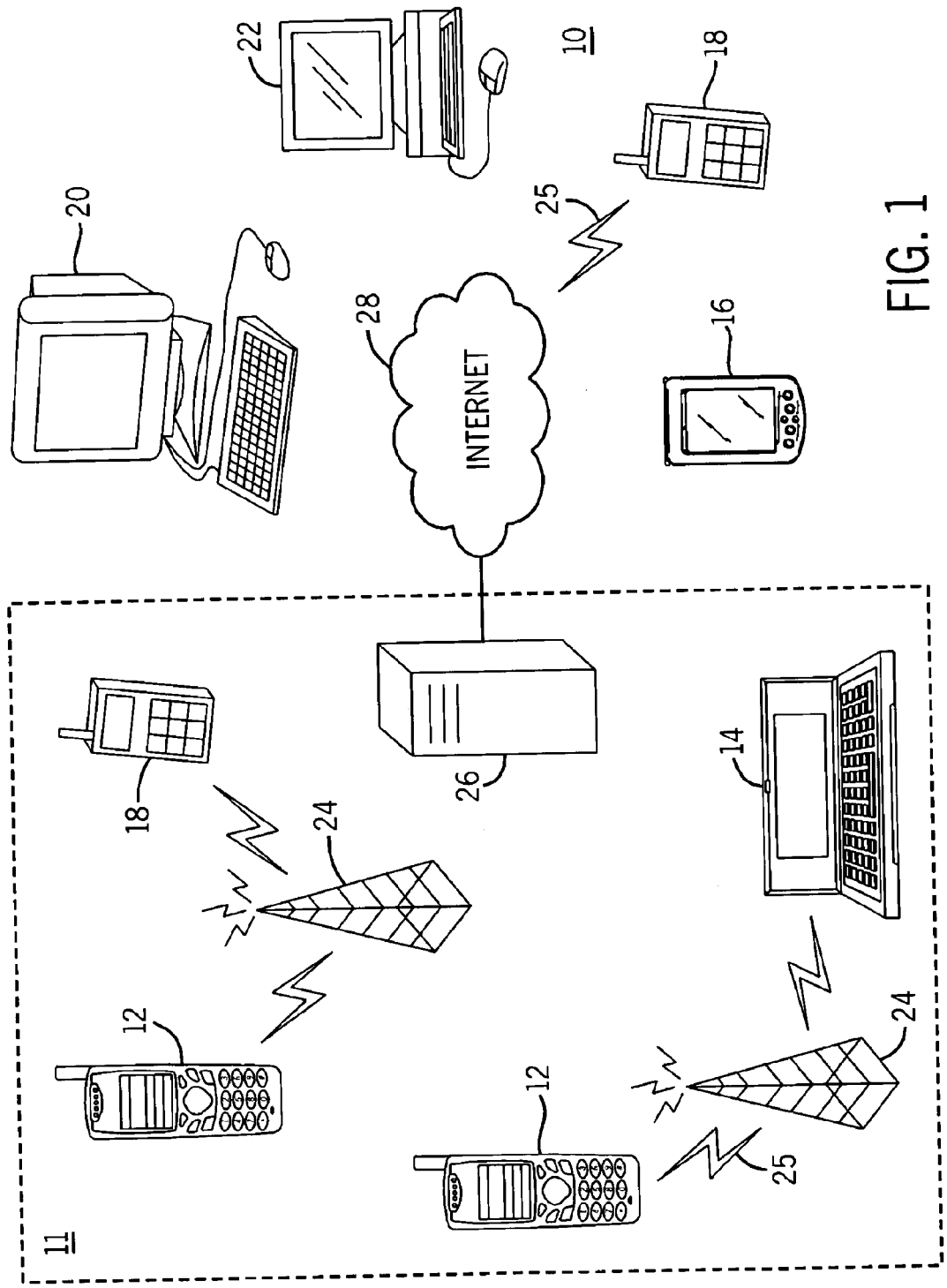
FIG. 1 is an overview diagram of a system within which the present invention may be implemented.

FIG. 1 shows a system 10 in which the present invention can be utilized, comprising multiple communication devices that can communicate through a network. The system 10 may comprise any combination of wired or wireless networks including, but not limited to, a mobile telephone network, a wireless Local Area Network (LAN), a Bluetooth personal area network, an Ethernet LAN, a token ring LAN, a wide area network, the Internet, etc. The system 10 may include both wired and wireless communication devices.

For exemplification, the system 10 shown in FIG. 1 includes a mobile telephone network 11 and the Internet 28. Connectivity to the Internet 28 may include, but is not limited to, long range wireless connections, short range wireless connections, and various wired connections including, but not limited to, telephone lines, cable lines, power lines, and the like.

The exemplary communication devices of the system 10 may include, but are not limited to, a mobile telephone 12, a combination PDA and mobile telephone 14, a PDA 16, an integrated messaging device (IMD) 18, a desktop computer 20, and a notebook computer 22. The communication devices may be stationary or mobile as when carried by an individual who is moving. The communication devices may also be located in a mode of transportation including, but not limited to, an automobile, a truck, a taxi, a bus, a boat, an airplane, a bicycle, a motorcycle, etc. Some or all of the communication devices may send and receive calls and messages and communicate with service providers through a wireless connection 25 to a base station 24. The base station 24 may be connected to a network server 26 that allows communication between the mobile telephone network 11 and the Internet 28. The system 10 may include additional communication devices and communication devices of different types.

The communication devices may communicate using various transmission technologies including, but not limited to, Code Division Multiple Access (CDMA), Global System for Mobile Communications (GSM), Universal Mobile Telecommunications System (UMTS), Time Division Multiple Access (TDMA), Frequency Division Multiple Access (FDMA), Transmission Control Protocol/Internet Protocol (TCP/IP), Short Messaging Service (SMS), Multimedia Messaging Service (MMS), e-mail, Instant Messaging Service (IMS), Bluetooth, IEEE 802.11, etc. A communication device may communicate using various media including, but not limited to, radio, infrared, laser, cable connection, and the like.

Figure 2:
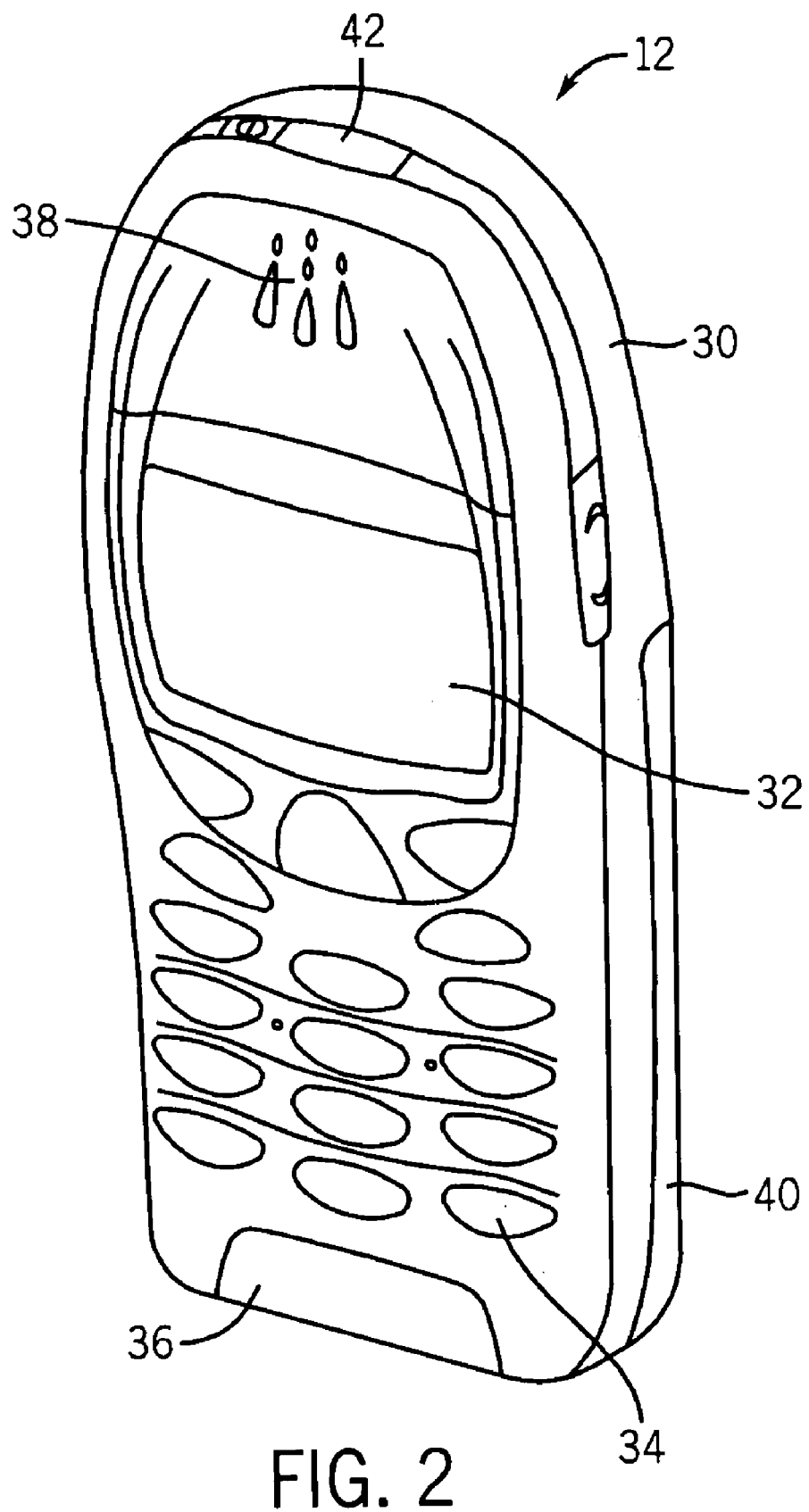
FIG. 2 is a perspective view of a mobile telephone that can be used in the implementation of the present invention.
Figure 3:
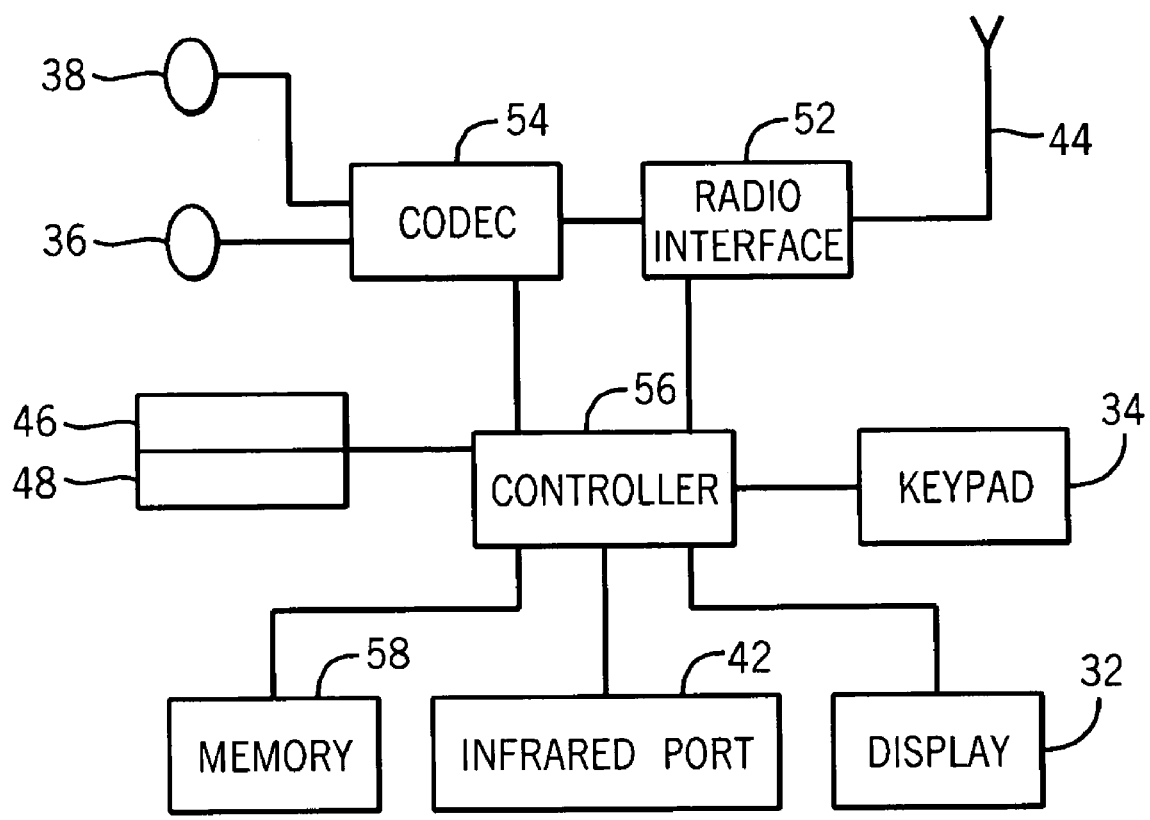
FIG. 3 is a schematic representation of the telephone circuitry of the mobile telephone of FIG. 2.

FIGS. 2 and 3 show one representative mobile telephone 12 within which the present invention may be implemented. It should be understood, however, that the present invention is not intended to be limited to one particular type of mobile telephone 12. The mobile telephone 12 of FIGS. 2 and 3 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment of the invention, a card reader 48, radio interface circuitry 52, codec circuitry 54, a controller 56 and a memory 58. Individual circuits and elements are all of a type well known in the art, for example in the Nokia range of mobile telephones.

The present invention combines context information analysis and mobile device usage in order to detect distress or emergency situations so as to request remote care and help as a part of mobile devices. The present invention takes advantage of the fact that many users perform a variety of normal actions with their mobile devices on a regular basis. For example, most mobile telephone users initiate voice calls at least a couple of times per day, answer a number of calls per day, and perform other actions. Additionally, many users will perform a variety of other actions on at least a semi-regular basis. These actions may include locking and/or unlocking the telephone keypad, changing the orientation of the phone, and many other activities. It is also possible that the telephone be capable of monitoring audio characteristics of the surrounding environment, providing the possibility of the mobile device gathering and analyzing even more information.

Based on the types of information discussed above and other information, a number of personally-created "triggers" can be programmed into the mobile device. For example, a trigger can be activated when the mobile device detects that a person has not made or answered any telephone calls in the previous day or two. Another trigger could be activated if it is detected that the mobile device has been in the same cellular cell or other geographic region for an entire day without moving. Other triggers can involve the device not being touched for a certain period of time, or a detection of complete or prolonged silent periods around the device. These triggers can be automatically programmed into the device before it is ever used, or the system can monitor a user's personal activities and generate "custom" triggers based upon the user's usage patterns. In addition, a user could also create his or her own personally-developed triggers and program them into the mobile device in one embodiment of the invention.

According to the present invention, when one or more triggering-events are detected, the device will initiate one or more predetermined actions. For example, if the mobile telephone has not been touched for a day, a SMS message can be automatically sent to a particular family member or friend stating "I have not touched my phone for a whole day, please contact me." In different embodiments of the invention, the predetermined actions can be manually input by the user, or there can be automatic "default" settings for actions. For example, if a user's contact list indicates that the user has a spouse, then the default action in response to a triggering event can be a SMS message to the spouse. In the case of individual actions, these actions can be customized in a wide variety of ways. For example, SMS messages can be personalized to reflect the relationship between the user and the contact (i.e., a person's mother can be addressed as "Mom," while other SMS messages may refer to an individual's first name.

As discussed above, in one embodiment of the invention the end user possesses complete control as to the nature and number of triggering events and predetermined actions. For example, when a user goes on a relatively dangerous hiking expedition, the desired triggering events may be quite different than when the user is spending a week-long vacation at home. In such a situation, a user interface of the electronic device would enable a user to activate and modify different event and care profiles.

Figure 4:
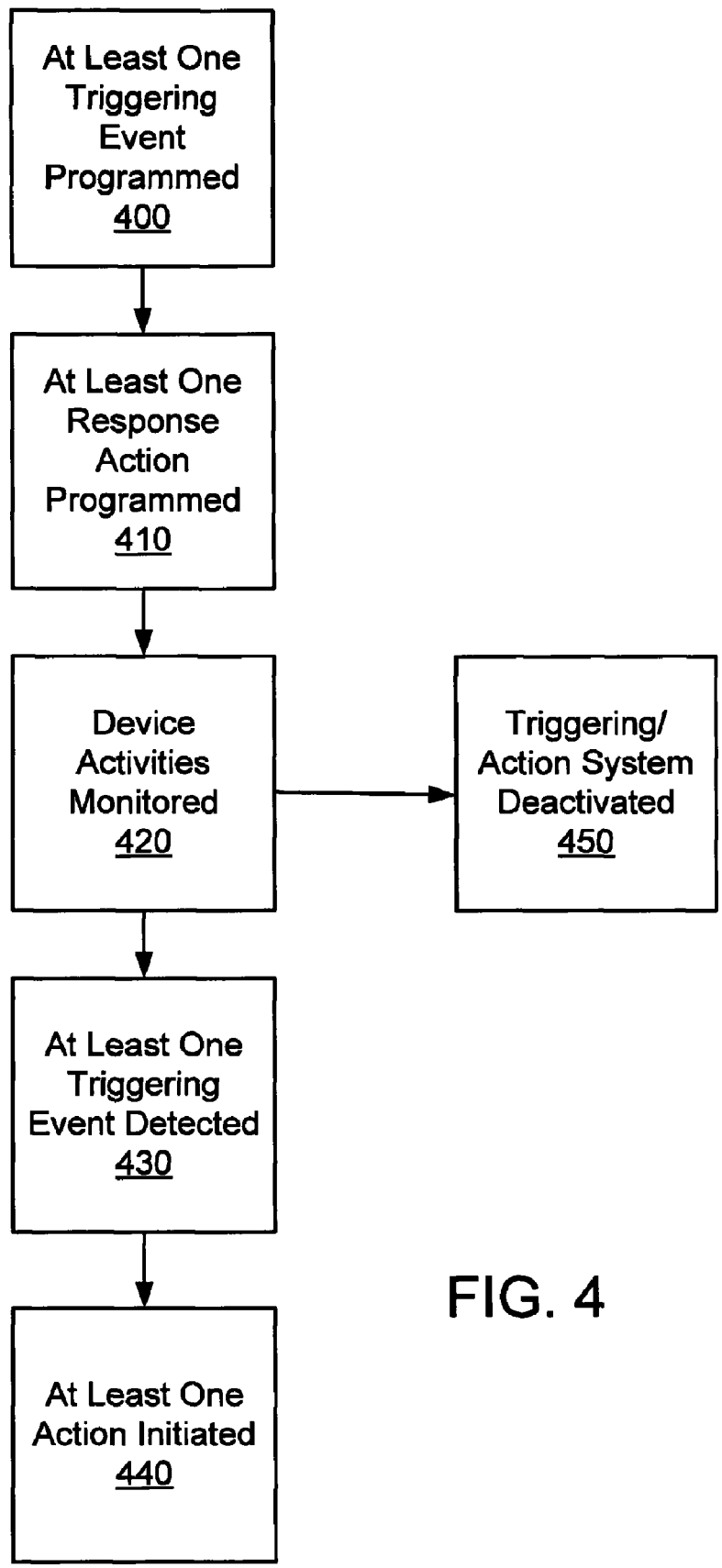
FIG. 4 is a flow chart showing the process for implementing one embodiment of the present invention.

FIG. 4 is a flow chart showing the implementation of one embodiment of the present invention. At step 400 in FIG. 4, at least one triggering event is programmed into an electronic device. As discussed previously, the triggering events can be manually input by a user, or the events can be pre-programmed into the device. The triggering events can be based upon a wide variety of characteristics, involving features of the phone itself (i.e., orientation, etc.), time duration (i.e., how long a telephone has not been used to make a call), geography (i.e., the location of the device), environmental considerations (i.e., the level of noise surrounding the device), and other characteristics. At step 410, at least one action is programmed into the electronic device, with the at least one action programmed to occur in response to the occurrence of the at least one triggering event. Once again, actions can be pre-programmed, or they can be programmed by the user. The actions can comprise messages such as SMS messages and can be transmitted to family, friends, or even emergency centers such as police and fire departments. It should also be noted that, both for steps 400 and 410, the term "programming" also refers to the ability of the system and/or the user to re-program existing triggering events and/or actions.

At step 420, the electronic device monitors the activity surrounding the electronic device. It should be noted that the actual monitoring can also occur remotely in an alternative embodiment of the invention. At step 430, the at least one triggering event is detected. The "at least one" even can comprise multiple triggering events, such as the user not making a call over a certain time period and the user not answering his or her phone over the same or a different time period. In response to the at least one triggering event, the system of the present invention performs the at least one action at step 440. Once again, the "at least one" action can comprise multiple actions, such as transmitting SMS messages to multiple individuals. In various embodiments of the invention, the user also possesses the ability to deactivate the triggering event and care system. Such deactivation is represented at step 450.

Figure 5:
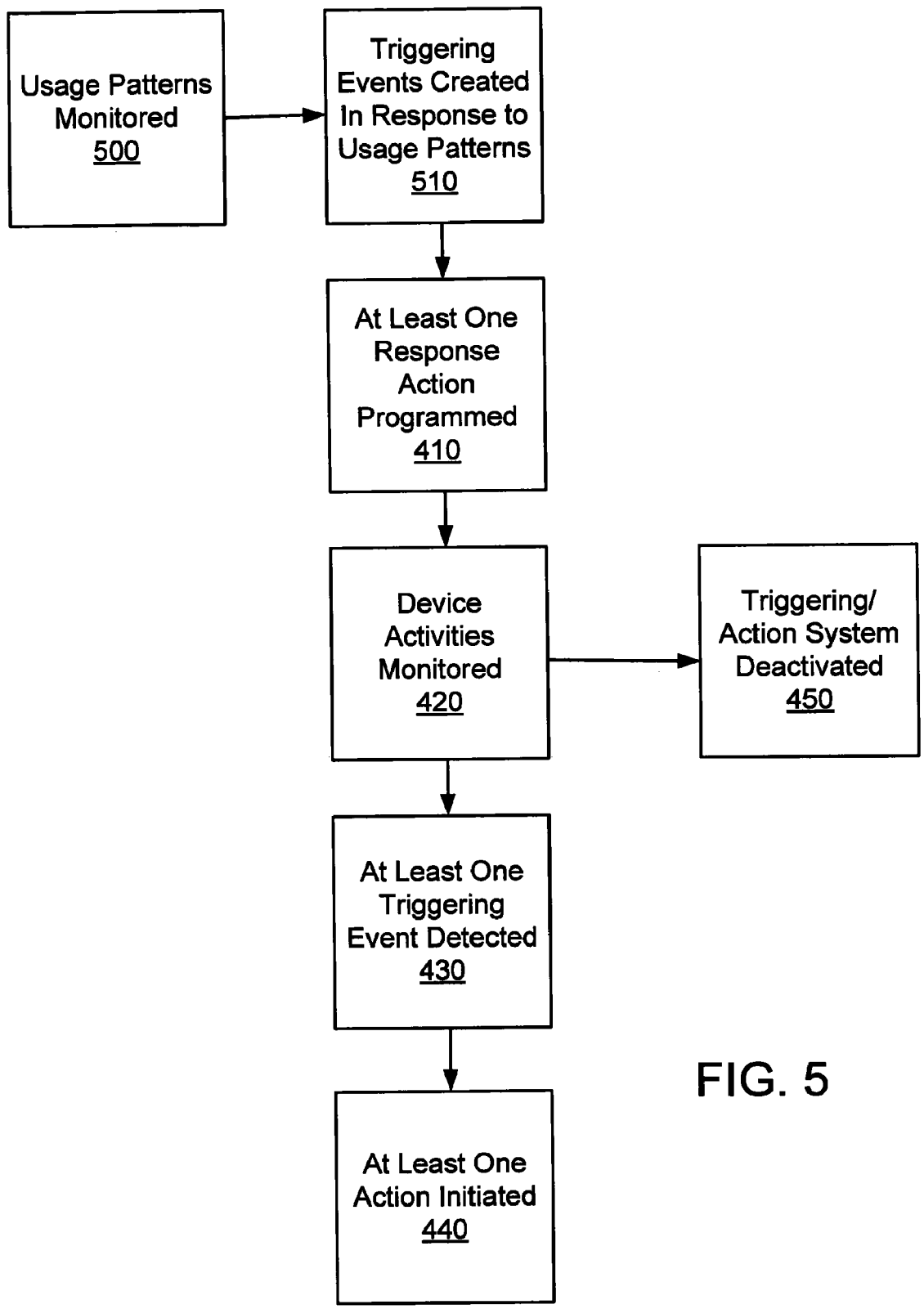
FIG. 5 is a flow chart showing the process for implementing another embodiment of the present invention

FIG. 5 shows an alternative embodiment of the present invention. In this embodiment, the system monitors the usage patterns of the user at step 500. For example, the system can monitor how often the user makes and receives a call, how often the user leaves a certain geographic region, etc. At step 510, the system uses the information gathered at step 500 to create custom triggering events. For example, if the system observes that the user typically makes ten phone calls in a day, a triggering event can comprise no phone calls being made in a single day. On the other hand, if the user only makes 2-3 phone calls per week, then the created triggering event may be the placing of no phone calls over an entire week. The remainder of the process is substantially similar to the process depicted in FIG. 4, where the user can either enter the appropriate actions to occur in response to triggering events, or default actions can be used.

The present invention is described in the general context of method steps, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software and web implementations of the present invention could be accomplished with standard programming techniques with rule based logic and other logic to accomplish the various database searching steps, correlation steps, comparison steps and decision steps. It should also be noted that the words "component" and "module," as used herein and in the claims, is intended to encompass implementations using one or more lines of software code, and/or hardware implementations, and/or equipment for receiving manual inputs.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments and with various modifications as are suited to the particular use contemplated.

What is claimed is:

1. A method of implementing situation-related action in a mobile electronic device, comprising:
   receiving a definition of at least one triggering event, the at least one triggering event involving situations relating to the mobile electronic device;
   receiving a definition of at least one response activity;
   monitoring the mobile electronic device for the occurrence of the at least one triggering event; and
   upon detecting that the at least one triggering event has occurred, performing the at least one response activity,
   wherein the at least one triggering event possesses a time-related aspect,
   wherein the at least one triggering event involves a lack of at least one specified activity occurring during a specified period of time, and
   wherein the at least one specified activity comprises the placing of a telephone call.

2. The method of claim 1, wherein the definition of the at least one response activity is received through an input by a user of the mobile electronic device.

3. The method of claim 2, wherein the definition of the at least one triggering event is received through an input by a user of the mobile electronic device.

4. The method of claim 1, wherein the at least one specified activity comprises the answering of a received telephone call.

5. The method of claim 1, wherein the at least one response activity comprises the transmission of a message to another entity.

6. The method of claim 5, wherein the message comprises a SMS message.

7. The method of claim 1, wherein the mobile electronic device comprises a mobile telephone.

8. A method of implementing situation-related action in a mobile electronic device, comprising:
   receiving a definition of at least one triggering event, the at least one triggering event involving situations relating to the mobile electronic device;
   receiving a definition of at least one response activity;
   monitoring the mobile electronic device for the occurrence of the at least one triggering event; and
   upon detecting that the at least one triggering event has occurred, performing the at least one response activity,
   wherein the definition of the at least one triggering event is determined based upon prior usage activities associated with the mobile electronic device, the prior usage activities including frequency of use of the mobile electronic device.

9. The method of claim 8, wherein the definition of the at least one response activity is received through an input by a user of the mobile electronic device.

10. The method of claim 9, wherein the definition of the at least one triggering event is received through an input by a user of the mobile electronic device.

11. The method of claim 8, wherein the at least one response activity comprises the transmission of a message to another entity.

12. The method of claim 11, wherein the message comprises a SMS message.

13. The method of claim 8, wherein the mobile electronic device comprises a mobile telephone.

* * * * *